March 28, 1961  F. A. GREENAWALT  2,976,701
REVERSING VALVE FOR REFRIGERATING SYSTEMS
Filed Dec. 30, 1957  2 Sheets-Sheet 1
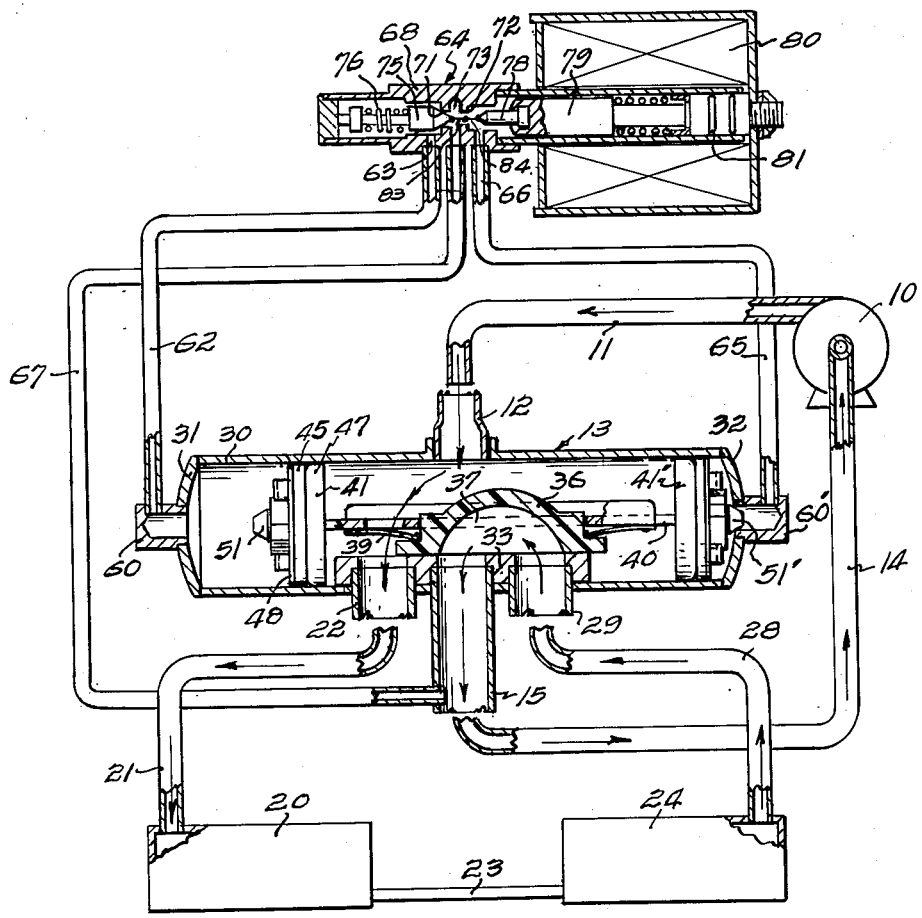
Fig. 1.
Fig. 3.
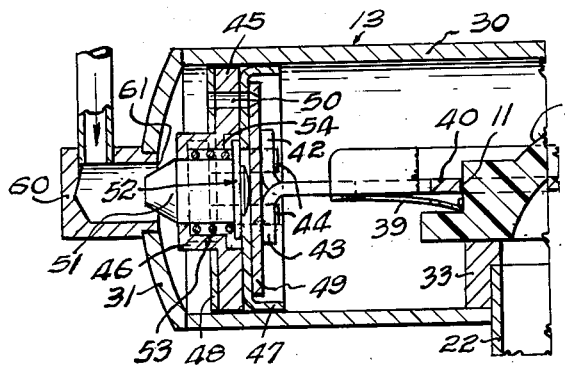
INVENTOR.
FREDERICK A. GREENAWALT
BY
Roy E. Raney
ATTORNEY.

March 28, 1961 F. A. GREENAWALT 2,976,701
REVERSING VALVE FOR REFRIGERATING SYSTEMS
Filed Dec. 30, 1957 2 Sheets-Sheet 2

INVENTOR.
FREDERICK A. GREENAWALT
BY
ATTORNEY.

United States Patent Office 2,976,701
Patented Mar. 28, 1961

2,976,701

REVERSING VALVE FOR REFRIGERATING SYSTEMS

Frederick A. Greenawalt, Fort Lauderdale, Fla., assignor to Ranco Incorporated, Columbus, Ohio, a corporation of Ohio Filed Dec. 30, 1957, Ser. No. 705,893

5 Claims. (Cl. 62—324)

The present invention relates to refrigerating systems and more particularly to a valve in a refrigerating system for selectively reversing the order of flow of refrigerant through the heat exchangers which may serve as either the condenser or evaporator respectively of a compressor-condenser-expander type refrigerating system.

The principal object of the present invention is the improvement in reversing valves in refrigerating sytems comprising a tubular valve chamber connected to the discharge and intake of the compressor and with two heat exchangers capable of functioning as either a condenser or evaporator and having valve mechanism therein for reversing the path of flow of refrigerant through the exchangers when shifted by a piston driven towards one end of the chamber which is connected by a bleed line and through a control valve to the suction or low pressure side of the refrigerating system, the improvement residing in the provision of a shut-off valve member in the chamber operative to positively close the bleed line after the piston has moved to shift the valve mechanism to a flow-reversing position, the shut-off valve member arranged to be moved by the piston to a position in which it is entrained in the refrigerant flowing into the bleed line and having a lost motion connection with the piston whereby it may be moved by the flow of refrigerant independently of the piston and thereby seat on the bleed line opening.

More specifically, an object of the invention is the provision of a valve for reversing the order of flow of refrigerant through the heat exchangers which function as either the condenser and evaporator of the refrigerating system of the type mentioned, the valve comprising a chamber connected by conduits with the discharge outlet of the compressor, the suction or low side of the compressor, the respective heat exchangers, shiftable valve means in the chamber for effecting connections with the openings of the various conduits mentioned to effect reversal of the direction of flow of refrigerant through the exchangers, piston means in the chamber for shifting the valve means, means forming restricted passages around the piston means to permit restricted flow of fluid through or around the piston to the end portions of the chamber, bleed lines connecting the ends of the chamber with the low side of the refrigerating system and permitting greater flow of fluid from the ends of the chamber than is permitted to flow to the chamber ends through the restricted passages, control valve means to selectively open and close one or the other of the bleed lines to connect one end or the other of the chamber with the suction inlet or the low pressure side of the system to thereby reduce the pressure at one end of the chamber and cause the piston to be driven by the pressure differential at opposite ends thereof to the end of the chamber connected with the suction or low side of the system, and shut-off valve members in the chamber moved by the piston means to a position in which they are entrained in the flow of refrigerant into the bleed line at the respective ends of the chamber, the shut-off valve members having lost motion relative to the piston means whereby they are moved to close the bleed lines indepedently of movement of the piston means and thereby tightly seal off the bleed lines after the piston means has moved to the valve shifting position and during the time the bleed lines are open to the control valve.

Other objects and advantages of the invention will be apparent from the following description of a preferred form of the invention, reference being made to the accompanying drawings wherein Fig. 1 is a schematic showing of a refrigerating system incorporating the invention, certain parts of the system being shown in section;

Fig. 3 is a fragmentary, sectional view of one end of the reversing valve of the refrigerating system showing the piston approaching one end of a stroke.

Figure 2:
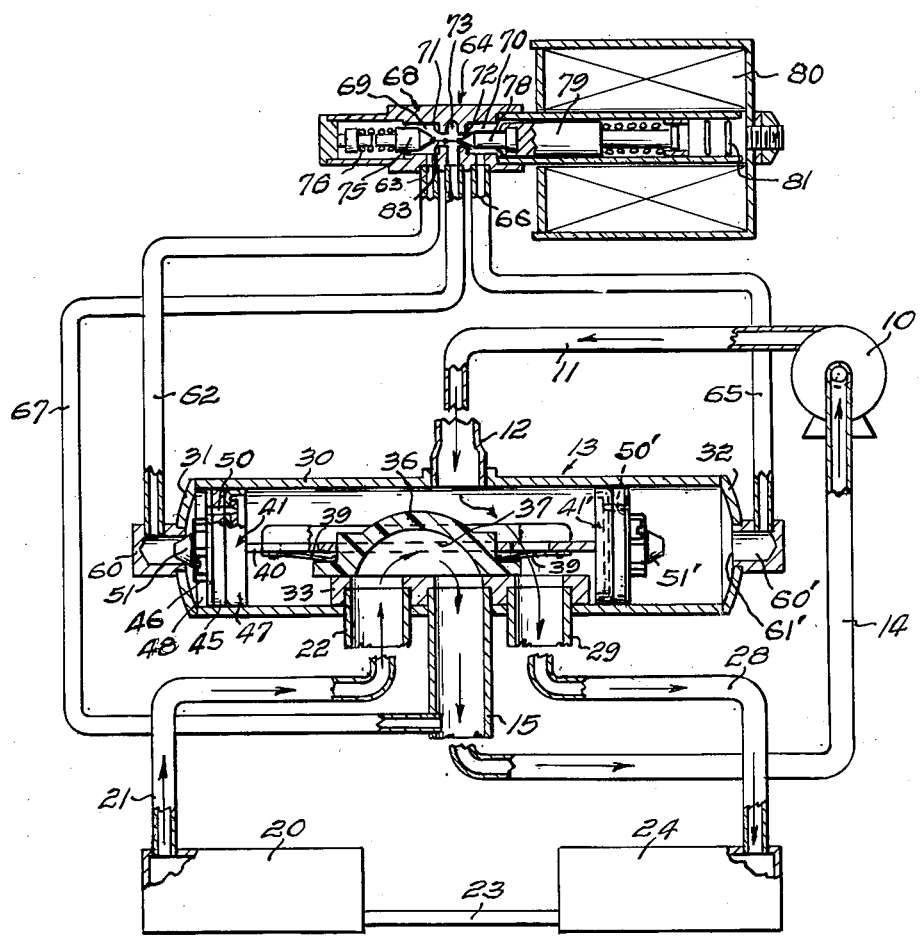
Fig. 2 is a view similar to Fig. 1, but showing the system in a reverse cycle operation.

In the form of the invention shown, a compressor-condenser-expander refrigerating system is shown including a conventional compressor 10 having its discharge connected by a conduit 11 to the inlet 12 of a reversing valve indicated generally at 13 and the suction inlet of the compressor is connected by a conduit 14 with the outlet 15 of the reversing valve.

A conventional heat exchanger 20, which is designed to function either as a condenser or evaporator, is connected with valve 13 through conduit 21 connected with one flow passage 22 of the reversing valve and the other end of exchanger 20 is connected by a suitable flow restriction tube 23 to one end of a second heat exchanger 24 which is similar to exchanger 20, in the usual manner, and the other end of exchanger 24 is connected by a conduit 28 with a second flow passage 29 of reversing valve 13. As will be explained in detail hereinafter, reversing valve 13 functions to selectively control the direction of flow of refrigerant through exchangers 20, 24. The exchanger 20 may be arranged for heat exchange with outdoor air and exchanger 24 is then located for heat exchange with air in a room or a refrigerator, for example. The purpose of reversing the refrigerant flow as described may be to cause periodic heating of exchanger 24 by changing its function from an evaporator to a condenser for quickly melting frost or ice which may have collected thereon, or the flow may be reversed to cause exchanger 24 to cool the interior of a room for example during warm periods of weather or to heat the room when it serves as a condenser during cooler periods of weather. The reversing of flow of refrigerant through the condenser and evaporator is well known in the art and further discussion thereof is deemed unnecessary.

In the present disclosure, reversing valve 13 comprises a cylindrical chamber 30 closed by end caps 31, 32, and inlet 12 thereof is approximately at the center thereof and outlet 15 is on the opposite side of the chamber from the inlet, as are passages 22, 29.

A valve plate 33 is secured, as by brazing, in chamber 30 and has openings or ports aligned with outlet opening 15 and the openings for the fluid passages 22, 29, and provides a flat surface on the interior of the chamber on which a valve member 36 slides. Valve member 36 has a cavity 37 formed to provide a passage between the outlet opening or low side passage 15 and one or the other of the ports to passages 22 or 29, as may be seen by reference to Figs. 1 and 2, which show valve member 36 in its two opposite positions. Preferably, valve member 36 is formed of nylon or a similar plastic which slides readily on the surface of plate 33 and forms a seal therewith against the passage of refrigerant therebetween.

Valve member 36 is shifted from one position to the other by a piston assembly comprising a plate 40 having a rectangular central opening through which valve member 36 projects and the end edges of the opening in the plate engage the valve member to provide a driving connection between the plate and member. Springs 39 attached to plate 40 bias valve member 36 against plate 33.

Figure 4:
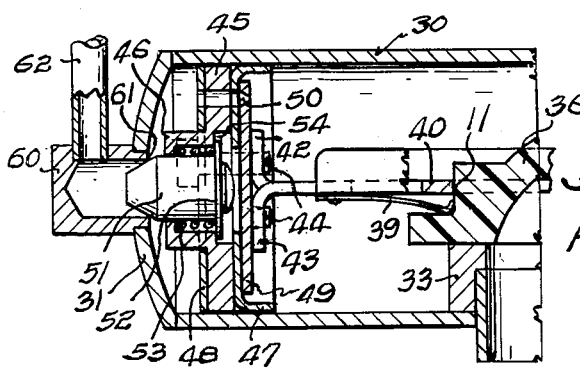
Fig. 4 is a view similar to Fig. 3 but showing certain parts in different positions.

Opposite ends of plate 40 have piston units 41, 41' attached thereto and for sake of clarity, only piston unit 41 is described in detail, and like elements of piston unit 41' bear the same reference characters but with a prime affixed thereto. Referring particularly to Figs. 3 and 4, the end portions of plate 40 are split and the branches are turned at 90° to the plate and 180° to one another and provide lugs 42, 43 to which units 41, 41' are attached by two screws 44.

Piston unit 41 comprises a disc 45 formed of moulded material, such as nylon, and has a hub portion 46. A flexible, annular seal 47 is secured against the inner face of disc 45 and has a skirt which engages the walls of chamber 30 to form a gas-tight seal therewith. Seal 47 and disc 45 are held together between two backing plates 48, 49 all of which are secured to the lugs 42, 43 by screws 44 extending through aligned openings in the members comprising the piston unit 41. A bleed opening 50 extends through the piston unit 41 to prvoide a restricted connection between the central portion of chamber 30 and the end portions thereof, the purpose of which will be made clear hereinafter.

A shut-off valve member 51 is carried within hub 46 and a central opening in disc 45 and has a flange 52 against which a compression spring 53 bears to urge valve member 51 against the backing plate 49. As may be seen in Figs. 3 and 4, compression spring 53 reacts against a shoulder formed by the reduced opening in the hub portion 46. It will be observed that the opening in disc 45 is undercut as shown at 54 to permit appreciable movement of valve member 51 relative to the piston unit 41 and thereby provides a lost motion connection with the piston unit. The end of valve member 51 projecting from the hub portion 46 is tapered to tightly fit in a valve seat described hereinafter.

End plates 31, 32 have bleed line fittings 60, 60' the inner ends of which project through an opening in the respective end plates 31, 32 and form valve seats 61, 61' against which valve members 51, 51' engage to seal off the openings through the fittings. Fitting 60 is connected by a conduit or bleed line 62 to one port 63 of a three-way valve, indicated generally at 64, and fitting 60' is connected by a bleed line 65 to a port 66 of valve 64. The bleed openings and lines just described are each capable of carrying a greater flow of refrigerant than either bleed opening 50, 50' through the piston units 41, 41'. Valve 64 may be of any suitable design for controlling the flow of fluid through one or the other of bleed lines 62 or 65 to the low side of the refrigerating system through a line 67 which is connected into conduit 15 leading to the intake or suction side of the compressor. In the form of the invention shown, valve 64 comprises a cylindrical body 68 having two outer chambers 69, 70 having valve seats 71, 72 respectively which lead into a central chamber 73 having an outlet to which conduit 67 is connected. A valve member 75 is normally urged by a compression spring 76 to engage seat 71 and a second valve member 78 is arranged to close on seat 72 and is carried by an armature 79 of a solenoid 80. Armature 79 is urged in the valve closing direction by a compression spring 81. Valve members 75, 78 are spaced by spacer pins 83, 84 which project from the respective valve members, as shown. Solenoid 80 is connected to a suitable circuit, not shown, and when the circuit is open, spring 81 is of such force relative to the spring 76 that it overcomes the latter to open valve member 75 from seat 71. Thus, when solenoid 80 is energized, armature 79 is drawn to the right, as viewed in the drawings, and removes valve member 78 from the seat 72 and permits spring 76 to close valve member 75 on seat 71 thereby opening bleed line 65 and closing bleed line 62.

Referring to Fig. 1, solenoid 80 is shown energized and valve member 78 is drawn from seat 72 thereby permitting valve member 75 to close seat 71 and seal off bleed line 62. Bleed line 65 is connected to the low side of the refrigerating system through line 67 so that a low pressure exists in fitting 60' and valve 51' closes the opening to bleed line 65. Slide valve member 3 is in its right hand position so that the flow of refrigerant from the compressor through conduit 11 enters valve chamber 30 through connection 12 and passes outwardly through connection 22, conduit 21 to heat exchanger 20 where the refrigerant is condensed and then fed through capillary 23 into exchanger 24, which serves as the evaporator, and the vaporized refrigerant is withdrawn from the evaporator through conduit 28, port 29 of valve 13, and back through connection 15 to the low side or inlet of the compressor. It will be understood that suitable means is provided for removing the heat from exchanger 20, and exchanger 24 is located in an area whose temperature is to be controlled, such as a room or, as explained hereinbefore, it may be in a refrigerator cabinet.

Should it be desirable to reverse the function of heat exchangers 20 and 24, such as to introduce heat into the room which is ordinarily cooled by heat exchanger 24, or to remove ice from the surface of the exchanger in the event the exchanger 24 is in a refrigerator, solenoid 80 is de-energized which permits spring 81 to move member 78 to close on seat 72 and at the same time moves valve member 75 from seat 71, as shown in Fig. 2. Thus, bleed line 62 is opened at 71 and connected to the low side of the system through line 67, and bleed line 65 is closed at 72. Upon shifting of valves 78, 75 as just described, the pressure at the left hand end of chamber 30, having been formerly subjected to the high pressure refrigerant admitted through bleed opening 50 through piston unit 41, now drops materially due to the fact that bleed line 62 and valve seat 72 permit greater flow than does bleed opening 50. Consequently, the high pressure refrigerant in the central portion of chamber 30 forces the piston assembly toward the left hand end of the chamber. Bleed opening 50' permits refrigerant to pass into the right hand end of the chamber 30 to balance pressure on opposite sides of piston unit 41'. As piston unit 41 approaches fitting 60, valve member 51 carried thereby in the manner shown in Fig. 3, is moved into the stream of flow of refrigerant entering through the bleed opening 50 and flowing into fitting 60, and when the entraining effect reaches a certain point the tension of spring 53 is overcome to cause the valve member to be drawn ahead of the piston unit and to be firmly drawn to the valve seat 61 of the fitting 60, as shown clearly in Fig. 4. Thus, as may be seen by comparison of Figs. 3 and 4, valve member 51 has a lost motion or free movement relative to the piston carried thereby so that it will move ahead of the piston and tightly seal off the bleed passage independently of movement of the piston. Without this lost motion movement, the pressure differentials moving the piston assembly would equalize on opposite sides of piston unit 41 before the valve could be moved to its sealing position and a continuous leakage to the low side of the refrigerating system would occur.

It will be understood that when solenoid 80 is again energized, valve members 75, 78 are shifted to the positions shown in Fig. 1 which opens line 65 and closes line 62 through three-way valve 64, thereby causing the piston units to move valve member 36 to the right hand position, and cause valve 51' to close on the bleed outlet as described relative to the operation of valve 51.

It will be seen that by my invention, a position valve shifting movement is obtained and leakage through the valve actuating structure is completely eliminated.

Although but one form of the invention has been shown, it is to be understood that other forms, modifications, and adaptations could be made within the scope of the claims which follow.

I claim:
1. In a reversible-cycle refrigerating system having a compressor, a condenser and an evaporator connected in a refrigerating circuit including a valve mechanism to selectively reverse the order of flow of refrigerant through the condenser and evaporator, said valve mechanism including a tubular chamber having the interior thereof connected with the discharge and the intake of the compressor and with the condenser and evaporator respectively, valve means shiftable in said chamber between two positons to reverse the order of flow of refrigerant through the condenser and evaporator, piston means in said chamber operable to shift said valve means from one of said two positions to the other in response to a decrease in pressure at one end of said piston means relative to the other end, means forming restricted passages from the discharge of the compressor to opposite ends of said chamber, bleed lines connecting the respective ends of said chamber with the intake of the compressor, control valve means for said bleed lines to selectively open and close said lines alternatively and thereby reduce the pressure in one end or the other of said chamber for causing movement of said piston means to the end of said chamber having the open bleed line, and shut-off valve means in said chamber operated by movement of said piston means to close the outlet of the bleed line toward which the piston means is moved.

2. In a reversible-cycle refrigerating system of the character defined in claim 1 further characterized by said shut-off valve means having a lost motion connection with said piston means to cause said valve means to shift to close said bleed line independently of movement of said piston in response to the flow of fluid into said bleed line.

3. In a reversible-cycle refrigerating system of the character defined in claim 1 further characterized by said shut-off valve means comprising a valve member carried on said piston, means to guide said member for limited movement relative to said piston means to close said bleed line, independently of movement of said piston.

4. In a reversible-cycle refrigerating system having a compressor, a condenser and an evaporator connected in a refrigerating circuit including a valve mechanism to selectively reverse the order of flow of refrigerant through the condenser and evaporator, said valve mechanism including a tubular chamber closed at the ends thereof by walls and having the interior thereof connected with the discharge and the intake of the compressor and with the condenser and evaporator respectively, valve means shiftable in said chamber between two positions to reverse the order of flow of refrigerant through the condenser and evaporator, reciprocable piston means in said chamber including two spaced piston heads operable to alternately shift said valve means from one of said two positions to the other in response to alternately decreased pressure in opposite ends of said chamber, means forming a restricted passage through said piston means to the ends of said chamber, a bleed line connecting each end of said chamber with the intake of the compressor, control valve means for said bleed lines to selectively open one line and close the other to thereby alternately reduce the pressure in opposite ends of said chamber for causing reciprocating movement of said piston to said one end of said chamber, said bleed lines having openings into the two end walls of said chamber, a valve member carried by each end of said piston heads for closing the respective bleed line openings, said valve members being alternately moved by said piston heads towards the respective bleed line openings when said piston heads move toward alternate valve changing positions, and the means providing lost motion between said piston head and valve member carried thereby to permit said members to move by fluid flow to engage the edges thereof said bleed openings independently of movement of said piston heads.

5. In a valve apparatus comprising a chamber having an end wall and a piston reciprocable in said chamber, said end wall having a valve seat therein to control flow of fluid from said chamber, a valve member carried by said piston and operative to close on said valve seat when said piston approaches said end wall of said chamber, means to support said valve member by a lost motion connection with said piston whereby said valve may move from said piston toward said valve seat independently of said piston movement, and spring means yieldingly urging said valve member to said piston and yieldable to permit movement of said member from said piston by flow of fluid acting thereon as it passes from said chamber into said valve port.

References Cited in the file of this patent
UNITED STATES PATENTS

| | | |
|---|---|---|
| 1,902,624 | Dotterweich | Mar. 4, 1933 |
| 2,474,304 | Clancy | June 28, 1949 |
| 2,598,362 | Daniels | May 27, 1952 |
| 2,708,561 | Ehlke | May 17, 1955 |
| 2,725,724 | Rosen | Dec. 6, 1955 |
| 2,765,628 | Anthony | Oct. 9, 1956 |